Patented July 19, 1949

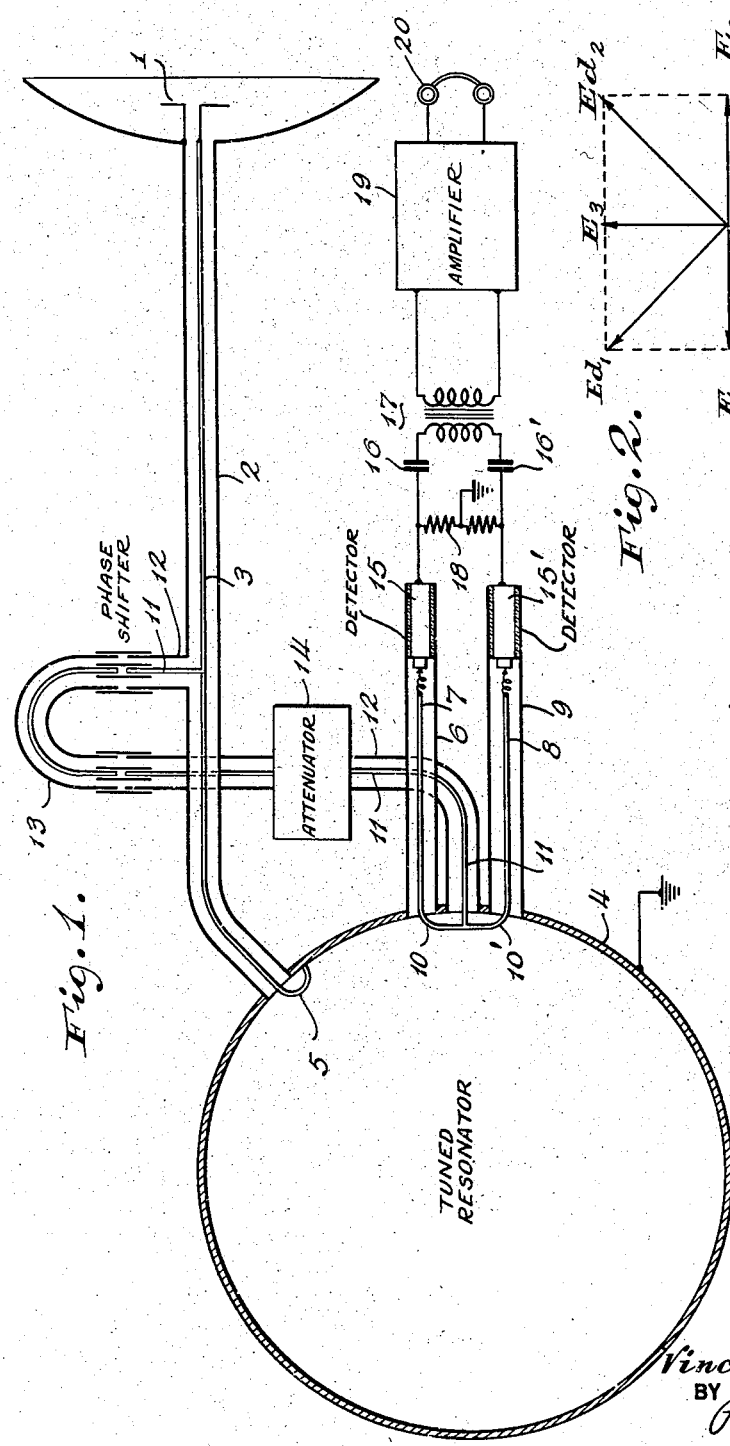

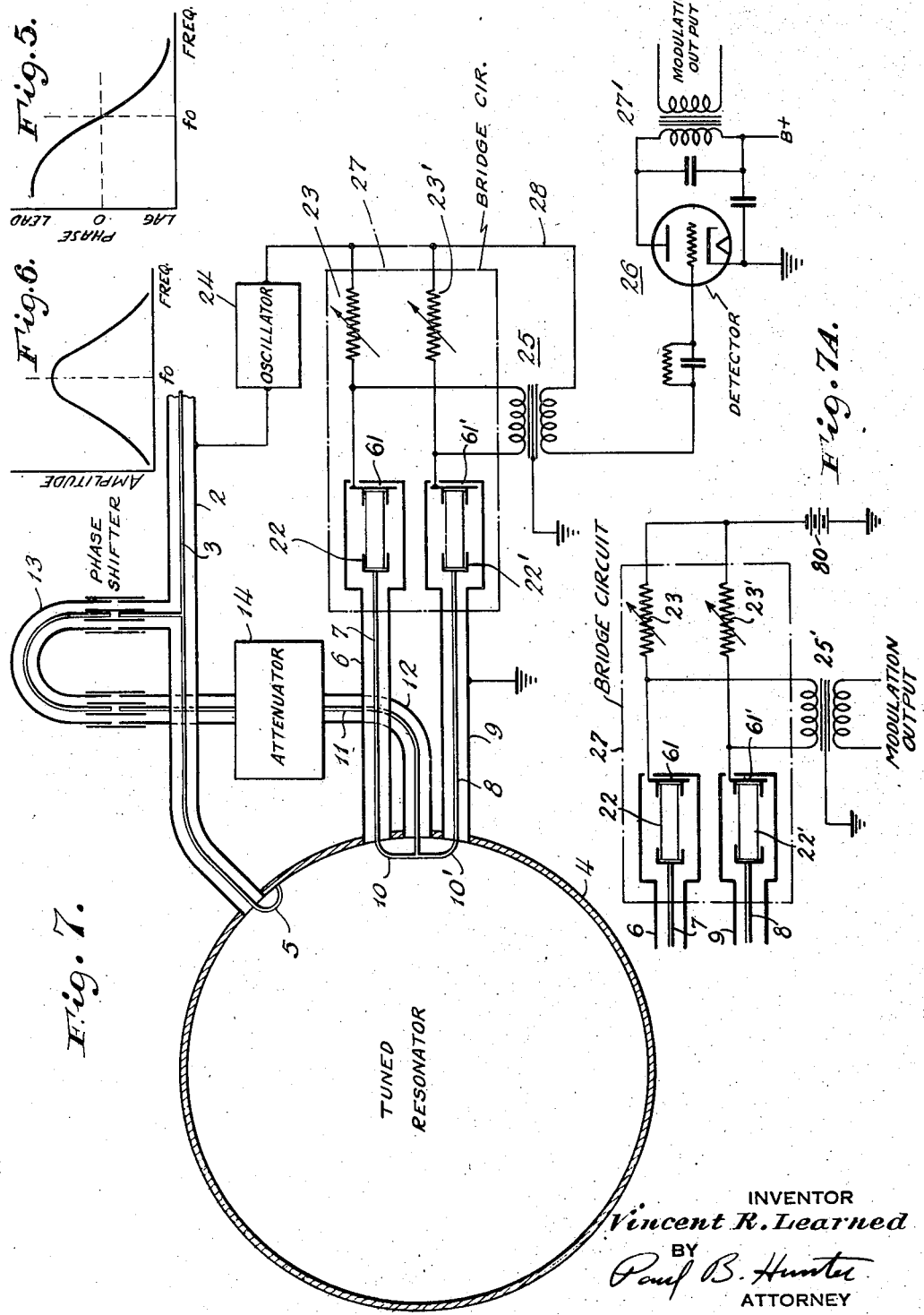

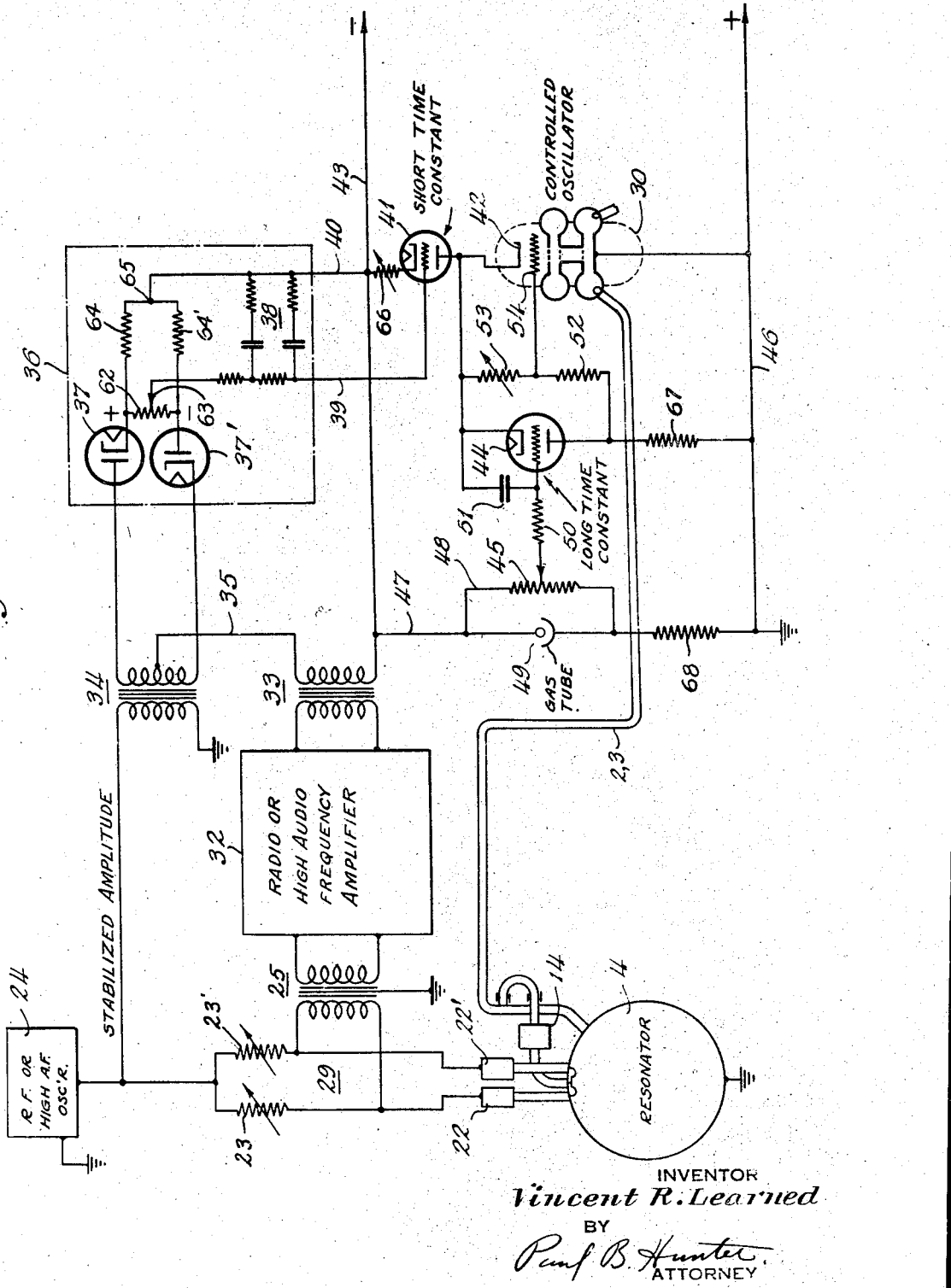

2,476,311

UNITED STATES PATENT OFFICE 2,476,311

ULTRA HIGH FREQUENCY DISCRIMINATOR AND APPARATUS

Vincent R. Learned, Hempstead, N. Y., assignor to The Sperry Corporation, a corporation of Delaware Application February 1, 1943, Serial No. 474,396

26 Claims. (Cl. 250—36)

The present invention relates, generally, to an ultra high frequency discriminator and to apparatus employing the same such as frequency stabilization systems or frequency modulation receivers or automatic frequency control systems.

Heretofore difficulties have been encountered in detecting frequency-modulated carriers in the ultra high frequency range due to the fact that the ordinary tuned transformer-rectifier arrangement used in discriminators is incapable of efficiently handling ultra high frequencies due to the large losses involved. Radiation at ultra high frequencies from tuned transformer circuits is enormous so that the resulting losses greatly reduce the overall efficiency of the discriminator.

The principal object of the present invention is to provide a novel ultra high frequency discriminator employing a cavity resonator and associated detector means for effecting detection of ultra high frequency-modulated carriers.

Another object of the present invention is to provide a novel ultra high frequency discriminator of relatively simple construction, high efficiency, and which is reliable in operation.

Still another object of the present invention is to provide a novel ultra high frequency discriminator adapted for other uses such as the stabilization of frequency of ultra high frequency oscillators.

Other objects and advantages of this invention will become apparent as the description proceeds.

Fig. 1 is a wiring diagram of one form of the novel discriminator of this invention, illustrated in a frequency modulation receiver.

Figs. 2, 3, 4, 5 and 6 are graphs illustrating operation of the discriminator.

Fig. 7 is a diagram similar to Fig. 1 but illustrating a somewhat modified construction employing a bridge circuit; Fig. 7A is a fragmentary diagram showing a modified form of the circuit of Fig. 7; and Fig. 8 illustrates the novel discriminator of this invention employed for stabilizing the frequency of an ultra high frequency oscillator.

Similar characters of reference are used in all of the above figures to indicate corresponding parts.

Referring now to the several figures of the drawings and particularly to Fig. 1 thereof, the reference numeral 1 designates suitable means for receiving a frequency-modulated high frequency wave, means 1 being shown for example as a receiving antenna feeding a concentric line 2, 3 that supplies energy to a hollow or cavity resonator 4 coupled to the line 2, 3 as by the coupling loop 5. The resonator 4 is normally tuned to the unmodulated or nominal frequency of the wave received at antenna 1. Two concentric lines 6, 7 and 8, 9 are coupled to the resonator 4 in phase opposition by the reversely mutually connected loops 10, 10' extending in opposite directions.

Wave energy directly from the high frequency source 1 is supplied through concentric line 11, 12 and phase shifter 13 through attenuator 14 in the same phase to both lines 6, 7 and 8, 9 through the connection of the inner conductor 11 to the point of connection of opposed loops 10 and 10'. The lines 6, 7 and 8, 9 are coupled to two crystal detectors 15 and 15'.

The other terminals of detectors 15 and 15' are connected through respective blocking condensers 16, 16' to the respective terminals of the primary winding of transformer 17. A resistor 18, having grounded center-tap, is connected between these other terminals of detectors 15 and 15', and serves to return the steady direct current outputs of the detectors 15 and 15' to ground. The secondary winding of transformer 17 is connected through an amplifier 19 to a suitable audio device such as the earphones 20.

In operation, the resonator 4 is energized from line 2, 3 to set up standing electromagnetic waves therewithin at the frequency of the received wave. The standing waves within the resonator 4 supply voltages through loops 10 and 10' to lines 6, 7 and 8, 9 that are directly out of phase, that is, are in phase opposition. The line 2, 3 supplies through line 11, 12, phase shifter 13 and attenuator 14 a voltage of common or like phase to both lines 6, 7 and 8, 9, which voltage is nominally 90° out of phase with the voltages supplied to lines 6, 7 and 8, 9 from the resonator 4 at the nominal or unmodulated frequency of the wave supplied thereto, this nominal phase relation being obtained through adjustment of the phase shifter 13. There are thus supplied to the detectors 15, 15' resultant voltages which result from the vectorial addition of the voltages supplied from the tuned resonator and that supplied directly from the line 2, 3. Since these detectors 15, 15' are connected in series bucking relation through the primary of transformer 17 the voltage alternating across this winding is zero when the resonator 4 is supplied with an unmodulated signal of the frequency to which it is tuned. For any frequency deviation of the input or received wave, such as due to frequency modulation or other frequency variation thereof, there results, from the phase shift versus frequency characteristics of the hollow resonator 4, a variation in the resultant voltages applied to the detectors 15, 15'. The phase versus frequency characteristic of the resonator is shown in Fig. 5 and the frequency versus amplitude characteristic of the resonator is shown in Fig. 6. When the voltages supplied from the resonator are combined with the voltage direct from the high frequency source, i. e., through line 11, 12, a frequency discriminating action is obtained as shown in the graph of Fig. 4 showing the relation between frequency deviation and the instantaneous magnitude of the resultant detected voltage.

Vector diagrams illustrating this detector action are shown in Figs. 2 and 3 wherein the vector $E_3$ represents the voltage obtained directly through the phase shifter 13 and attenuator 14. The vectors $E_1$ and $E_2$ represent the voltages obtained by means of coupling from the resonator, i. e., supplied to lines 6, 7 and 8, 9, the polarity of $E_1$ being opposite to $E_2$ since the coupled loops 10 and 10' extend in opposite directions and have oppositely phase voltages induced therein. The vector sum of $E_1$ and $E_3$ is $Ed_1$ and the vector sum of $E_2$ and $E_3$ is $Ed_2$. The two detectors 15 and 15' respond to the magnitude of $Ed_1$ and $Ed_2$. Fig. 3 shows how the magnitudes of $Ed_1$ and $Ed_2$ differ when there is a phase deviation from the 90° relationship due to frequency modulation or variation of the received or input wave.

Thus, for nominal conditions with no frequency modulation taking place, the conditions existing in Fig. 2 is obtained, but when a frequency deviation takes place in the input or received signal, the output of one detector becomes smaller and the other becomes larger as indicated in Fig. 3 giving a net output which is twice the change in the output of one detector. The output versus frequency curve for this detection arrangement is shown fully in Fig. 4 of the drawing.

It is to be understood that though the source 1 is shown by way of illustration, any other source of supply such as direct coupling to an ultra high frequency oscillator may be used depending upon the needs of any particular installation.

A slightly modified arrangement is shown in Fig. 7 of the drawings wherein thermally responsive resistors 22 and 22' are shown coupled to the lines 6, 7 and 8, 9. These resistors 22 and 22' vary in resistance in accordance with the heating thereof due to current flowing therein. Such resistors may take the form of the commercially available "Littlefuses." Such "Littlefuses" vary in resistance in accordance with the amplitude of the wave of ultra high frequency applied thereto. These "Littlefuses" are arranged in a bridge circuit 21 including the adjustable resistors 23, 23'. Thus one terminal of "Littlefuse" 22 is connected to the inner conductor 7 of line 6, 7, the other terminal being connected to the resistor 23. Similarly one terminal of "Littlefuse" 22' is connected to inner conductor 8 of line 8, 9, the other terminal being connected to resistor 23'. These other terminals of "Littlefuses" 22, 22' are also by-passed to ground with respect to ultra high frequencies by the capacitances indicated schematically at 61 and 61', respectively, so that the high frequency current in line 6, 7, flows through "Littlefuse" resistor 22, and that in line 8, 9 flows through "Littlefuse" resistor 22'. A local oscillator 24 is employed and supplies a radio frequency or high audio frequency voltage to the bridge. So long as the output of lines 6, 7 and 8, 9 and hence the excitation of resonator 4 conforms to the resonant frequency of resonator 4, as shown in Fig. 2 the bridge is balanced giving zero output.

However, a change in the source frequency, i. e., that supplied through line 2, 3, results in unbalancing the bridge due to oppositely varying the impedances of the "Littlefuses," giving an output alternating voltage across the primary of a transformer 25 connected to the bridge midpoints, which output voltage has a relative phase sense and magnitude that depends upon the direction and magnitude of the source frequency deviation. Thus, for changes in the frequency of the wave applied to the resonator 4, the bridge circuit unbalances and the relative polarity or phase-sense of the A. C. obtained from the bridge and appearing across the primary of transformer 25 will depend upon the direction of frequency change. By combining this output voltage of the secondary of transformer 25 with a voltage derived from oscillator 24 of like or opposite phase supplied through lead 28, an amplitude modulated wave is obtained which may be detected by an ordinary linear detector 26 after amplification, if desired. The modulation output of detector 26 is supplied through transformer 27' for energizing any suitable audio device. If desired, the local oscillator 24 could be replaced by a source of direct current potential, as shown in Fig. 7A, in which event the additional detector 26 would be unnecessary.

Fig. 8 shows the discriminator structure of this invention employed for stabilizing the frequency of an ultra high frequency oscillator as of the type disclosed in Varian Patent 2,242,275, issued May 20, 1941. In the system shown in Fig. 8, either crystal or "Littlefuse" detectors may be employed, the "Littlefuses" being shown for purposes of illustration. In this arrangement, 30 designates the ultra high frequency oscillator whose frequency is to be stabilized. A portion of the output of this oscillator is supplied through line 2, 3 to the resonator 4 in the manner shown in Figs. 1 and 7, and the reversible-phase, variable magnitude output of the bridge 29, derived as explained with respect to Fig. 7, is supplied through transformer 25 to the amplifier 32. This amplifier thus amplifies the voltage output of the bridge, which voltage is proportional in magnitude to the detuning of the resonator 4 relative to the frequency of oscillator 30 and has a polarity or phase-sense that corresponds to the direction of detuning. This apparatus is thus for similar to that of Fig. 7.

One terminal of the secondary winding of transformer 33 is connected by way of lead 35 to the center tap of a transformer 34 energized with fixed or stabilized amplitude from the oscillator 24, the other terminal of the secondary of transformer 33 being conected to lead 43. Connected across the secondary winding of transformer 34 are a pair of rectifiers 37, 37', the cathode of tube 37 being connected to the anode of tube 37' by a resistor 62 provided with a movable tap 63. Connected in parallel with resistor 62 are a pair of series connected resistors 64 and 64', whose junction or center-tap 65 is connected directly to lead 43. Tubes 37 and 37' and their associated circuit elements constitute a detector 36 for producing an output unidirectional voltage between taps 63 and 65 corresponding to the unbalance of bridge 29. In operation, the reversible-phase output of transformer 33 is either in phase coincidence or phase opposition with the reference voltages provided by secondary voltages of transformer 34. In this way, the reversible-phase signal voltage is added to one voltage derived from transformer 34 and the sum is applied to one of tubes 37, 37'. The reversible phase signal is also subtracted from the other voltage of transformer 34 and the difference is applied to the other of the tubes 37, 37'. With zero reversible-phase voltage from transformer 33, equal unidirectional voltages will be derived across the resistors 64, 64'. With a voltage appearing in the output of transformer 33, the resultant rectified voltage of resistor 64, for example, will exceed that across resistor 64', depending upon the phase of the reversible-phase voltage in relation to that of the reference voltages derived from transformer 34. In this way, zero voltage is produced between taps 63 and 65, when no voltage appears in the output of transformer 33, while, for a predetermined phase of the reversible-phase output voltage from transformer 33, a corresponding polarity of unidirectional output voltage is produced between taps 63 and 65. For opposite phase of voltage output from transformer 33, opposite polarity output voltage would be produced between taps 63 and 65.

The voltage appearing between taps 63 and 65 is thus proportional in magnitude to the deviation of the output frequency of oscillator 30 from the resonant frequency of resonator 4, and has a polarity corresponding to the sense of this frequency deviation. This output voltage is connected through a ripple filter 38 and leads 39 and 40 to the grid circuit of a control tube 41. Lead 40 is connected to the negative voltage supply line 43 and the cathode of tube 41 is connected to lead 43 through an adjustable biasing resistor 66. Tube 41 is connected in series with resistors 52, 53 and 67 across the oscillator electron beam accelerating voltage source, whose positive terminal is connected to line 46 and negative terminal is connected to line 43. The effective resistance of tube 41 is controlled by the output of detector 36, so that tube 31, in cooperation with resistors 52, 53 and 67, operates as a variable voltage divider in response to the frequency sensitive signals derived from detector 36. Oscillator 30 has its anode connected to line 46 and its cathode 42 connected to the anode of tube 41, so that its cathode-anode circuit is connected across resistors 53, 52 and 67. In this way, by varying the resistance of tube 41, the cathode-anode or beam accelerating voltage for oscillator 30 is adjusted. Such an adjustment of the beam accelerating voltage in response to the output of detector 36 serves to adjust the frequency output of oscillator 30, and in a sense to restore this frequency to the resonant frequency of resonator 4. Therefore, any deviation in the output frequency of oscillator 30 from the desired value represented by the resonant frequency of resonator 4, produces an unbalance in bridge 29, thereby creating a reversible-phase, variable magnitude, alternating signal output from transformer 33 which, in turn, produces a reversible-polarity, variable magnitude, unidirectional signal output from detector 36, which serves to control tube 41 and thereby adjust the oscillator beam accelerating voltage to restore the oscillator frequency to the resonant frequency of resonator 4.

Tap 65 is set so that at the normal operating condition of oscillator 30 its frequency will be equal to that of resonator 4 and no bridge unbalance occurs. Tap 65 may also serve as a manual control for the oscillator frequency.

Tube 41 responds instantly to any change in its input signal and thereby maintains the oscillator frequency substantially constant even in response to tendencies for rapid frequency change. However, the range of frequency control which can be effected by controlling the accelerating voltage of oscillator 30 is limited. Furthermore, there are factors, such as heating of the oscillator elements or changes in ambient temperature, which tend to cause the oscillator frequency to drift slowly in frequency by substantial amounts. These frequency drifts may be beyond the range of control of tube 41 and also have the further disadvantage that they require appreciable signal outputs from detector 36 to maintain the oscillator frequency constant. Such appreciable signals can be produced only by an appreciable frequency deviation, and therefore prevent the oscillator frequency from being maintained close to the resonator frequency.

In order to overcome this defect, the present invention also provides a further frequency control for oscillator 30. Thus, it has been found that frequency changes in oscillators of this type can also be produced by controlling the electron beam current intensity as by means of a control grid 54. According to the present invention, the control grid 54 of oscillator 30 is controlled in response to persisting changes in the beam accelerating voltage of oscillator 30. For this purpose, a second control tube 44 is utilized.

The control potential impressed on the grid of control tube 44 with respect to its cathode has two components. The first component is constant and obtained from a voltage divider consisting of resistor 45 and resistor 68 connected in series between supply leads 43 and 46. The variable tap of resistor 45 is connected to the grid of tube 44 through a resistor 50. The second component of voltage applied to the input circuit of tube 44 is the oscillator accelerating voltage appearing between cathode 42 and ground lead 46. It will be clear that the voltage between the cathode and grid of tube 44 is essentially the difference between the oscillator beam accelerating voltage and the fixed or bias potential derived from resistor 45.

A condenser 51 is connected between the grid and cathode of tube 44 and serves, together with resistor 50, to provide a long time constant for the input circuit of tube 44, so that this tube 44 will respond only slowly, or after a delay, to changes in the accelerating voltage of the oscillator 30.

Control grid 54 of oscillator 30 is connected to the junction of resistors 52 and 53, which, in turn, are connected in series between the cathode and anode of tube 44. Tube 44 therefore serves to variably shunt resistors 52 and 53, since the resistance of tube 44 depends upon its grid voltage which, in turn, depends upon the oscillator beam accelerating voltage. The potential of control grid 54 depends upon this shunting action of tube 44. Thus, if tube 44 operates as a complete short-circuit, the potential of grid 54 will be the same as that of cathode 42. If tube 44 operates as a completely open circuit, the potential of grid 54 will be more positive than that of cathode 42 by the volt drop across resistor 53, which may be made adjustable to adjust the nominal oscillator grid voltage. With intermediate variations of resistance of tube 44, corresponding intermediate variations of potential will be applied to grid 54. In this way, the potential of grid 54 is controlled in accordance with the accelerating voltage of oscillator 30. Resistor 50 and condenser 51 are such that only persisting changes in the accelerating voltage will modify the grid voltage of oscillator 30.

In effect, tube 44 and grid 54 serve to modify the datum level for the frequency of oscillator 30, permitting a relatively close and instantaneous control to be maintained by tube 41. A gas voltage regulator tube 49 may be connected across resistor 45 to keep its volt-drop constant.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. Ultra high frequency apparatus comprising a hollow resonator, means for supplying a variable frequency carrier to said resonator for setting up standing electromagnetic waves therewithin, means coupled to said resonator for deriving out of phase signals therefrom, means for combining a portion of the variable frequency carrier with said derived signals, said carrier portion being displaced in phase with respect to the phases of said derived signals, and a detector circuit connected for receiving the said derived signals, said detector circuit comprising a bridge arrangement having two legs thereof supplied with said respective derived signals said bridge arrangement comprising "Littlefuses" in said legs whereby the resistances of said legs vary with variation in the respective derived signals.

2. Ultra high frequency apparatus comprising a hollow resonator, means for supplying a variable frequency carrier to said resonator for setting up standing electromagnetic waves therewithin, means coupled to said resonator for deriving out of phase signals therefrom, means for combining a portion of the variable frequency carrier with said derived signals, said carrier portion being displaced in phase with respect to the phases of said derived signals, a detector circuit connected for receiving the said derived signals, said detector circuit comprising a bridge arrangement having two adjacent legs thereof supplied with said respective derived signals, means for supplying an alternating potential to one diagonal of said bridge, and alternating-current-utilization means connected across the other diagonal of said bridge.

3. Ultra high frequency apparatus comprising a hollow resonator, means for supplying a variable frequency carrier to said resonator for setting up standing electromagnetic waves therewithin, means coupled to said resonator for deriving out of phase signals therefrom, means for combining a portion of the variable frequency carrier with said derived signals, said carrier portion being displaced in phase with respect to the phases of said derived signals, a detector circuit connected for receiving the said derived signals and the combined carrier portion, said detector circuit comprising a bridge arrangement having two legs thereof supplied with said respective derived signals and combined carrier portion and having a local oscillator connected for supplying the mid-points of said bridge, and means for combining a version of the output of said bridge with a portion of the output of the local oscillator to thereby obtain an amplitude modulated wave.

4. Ultra high frequency apparatus comprising a hollow resonator, means for supplying a variable frequency carrier to said resonator for setting up standing electromagnetic waves therewithin, means coupled to said resonator for deriving out of phase signals therefrom, means for combining a portion of the variable frequency carrier with said derived signals, said carrier portion being displaced in phase with respect to the phases of said derived signals, a detector circuit connected for receiving the said derived signals and the combined carrier portion, said detector circuit comprising a bridge arrangement having the legs thereof supplied with said respective derived signals and combined carrier portion and having a local oscillator connected for supplying the mid-points of said bridge, means for combining a version of the output of said bridge with a portion of the output of the local oscillator to thereby obtain an amplitude modulated wave and means for detecting said amplitude modulated wave.

5. Ultra-high-frequency apparatus comprising a hollow resonator, means for supplying a variable frequency carrier to said resonator for setting up standing electromagnetic waves therewithin, means coupled to said resonator for deriving out-of-phase signals therefrom, means for combining a portion of the variable frequency carrier with said derived signals, said carrier portion being displaced in phase with respect to the phases of said derived signals, a detector circuit connected for receiving the said derived signals, said detector circuit comprising a bridge arrangement having two legs thereof supplied with said respective derived signals, means for supplying a potential to the mid-points of said bridge, and an ultra high frequency oscillator connected to said detector means to be controlled as to frequency thereby, said variable frequency carrier supplying means being connected to the output of said ultra high frequency oscillator, whereby a portion of the output of said oscillator is fed to said hollow resonator.

6. Apparatus of the character described comprising an ultra high frequency oscillator, a cavity resonator connected to receive a portion of the output of said oscillator, means for deriving out of phase potentials from said resonator and for combining a portion of the output of said oscillator with said potentials, detector means for receiving and detecting said combined potentials, and means fed with the output of said detector means connected for controlling the frequency of said oscillator said frequency-controlling means comprising long and short time-constant circuits for effecting accurate control of the frequency of said oscillator.

7. Apparatus for receiving a frequency-modulated ultra high frequency wave, comprising a cavity resonator tuned to the nominal carrier frequency of said wave, means for deriving a pair of oppositely phased potentials from said resonator, means for combining said potentials with a phase-shifted version of said wave, and detector means for detecting said combined potentials and for producing an alternating output corresponding to the difference between the amplitudes of said combined potentials, whereby said alternating output corresponds to the modulation signal of said frequency modulated wave.

8. Apparatus for receiving a frequency-modulated ultra high frequency wave, comprising a cavity resonator tuned to the nominal carrier frequency of said wave, means for deriving a pair of oppositely-phased potentials from said resonator, means for combining said potentials with a phase-shifted version of said wave, and means responsive to said combined potentials for deriving the modulation signal of said wave.

9. Frequency control apparatus for a high frequency electron beam oscillator whose output frequency is sensitive to the electron beam accelerating voltage and to the electron beam intensity, comprising means responsive to deviation of the output frequency of said oscillator from a desired value for controlling the beam accelerating voltage in a sense tending to restore said oscillator frequency to said desired value, and means responsive to variation in said accelerating voltage for controlling said beam intensity also in a sense tending to restore said oscillator to said desired value, said last two means having different time constants.

10. Apparatus as in claim 9, wherein said last-named means has a relatively long time constant and said first-named means has a relatively short time constant.

11. Frequency control apparatus comprising a source of adjustable ultra high frequency energy of a frequency to be controlled and having a pair of frequency-controlling electrodes, means responsive to deviation of the output frequency of said source from a predetermined value for applying a control potential to one of said electrodes in a sense to restore said source frequency to said predetermined value, said means having a relatively short time constant, and means responsive to the potential of said one electrode for controlling the other of said frequency-determining electrodes, said last-named means having a relatively long time constant, whereby said one electrode serves to overcome quick tendencies of said source to vary in frequency, and said other electrode tends to oppose persisting tendencies of said source to vary in frequency.

12. Frequency control apparatus for a source of high frequency energy having a pair of separate frequency-controlling electrodes, comprising means responsive to deviation of the frequency of said source from a desired value for applying a potential to one of said electrodes in a sense tending to restore said source to said desired value, and means responsive to the potential of said one electrode for controlling the other of said electrodes also in a sense tending to restore said source frequency to said desired value, said last two means having different time constants.

13. Frequency control apparatus for a source of high frequency energy having a pair of separate frequency - controlling elements, comprising means responsive to deviation of the frequency of said source from a desired value for controlling one of said elements to adjust the frequency of said source, and means responsive to said first control means for controlling the other of said elements also to adjust said source frequency, said two means having different time constants.

14. Frequency control apparatus for a high frequency electron beam oscillator whose output frequency is sensitive to the electron beam accelerating voltage and to the electron beam intensity, comprising means responsive to deviation of the frequency of said oscillator from a desired value for controlling the beam accelerating voltage in a sense tending to restore said oscillator frequency to said desired value, and means responsive to variation in said accelerating voltage for controlling said beam intensity also in a sense tending to restore said oscillator to said desired value.

15. Frequency control apparatus for a source of high frequency energy having a pair of separate frequency-controlling electrodes, comprising means responsive to deviation of the frequency of said source from a desired value for controlling the potential of one of said electrodes in a sense tending to restore said source to said desired value, means for producing a modified version of the potential of said one electrode, and means responsive to said modified potential for controlling the other of said electrodes also in a sense tending to restore said source frequency to said desired value.

16. High frequency apparatus comprising a bridge circuit having a pair of passive impedance elements in two adjacent arms thereof, said elements having variable impedance magnitude in correspondence with variation in high frequency energization thereof, means for producing a pair of high frequency waves of the same frequency and having amplitudes varying oppositely in response to predetermined change in a given condition, means for energizing each of said pair of elements by a respective one of said waves, said bridge being normally balanced for a predetermined relation between the energizations of said elements, whereby said bridge is unbalanced in correspondence with deviation of the amplitudes of said high frequency waves from said predetermined relation and in a sense corresponding to the sense of said deviation, and means responsive to unbalance of said bridge for producing a signal corresponding to said deviation.

17. High frequency apparatus comprising a bridge circuit having a pair of passive impedance elements in adjacent arms thereof, said elements having variable impedance magnitude in correspondence with high frequency energization thereof, a source of relatively low frequency operating independently of said bridge circuit and connected between the junction of said elements and an opposite junction of said bridge, means for producing a pair of high frequency waves of the same frequency whose amplitudes have a variable relation, means for exciting each of said pair of elements by a respective one of said waves, said bridge being balanced upon energization of said elements by said waves in predetermined amplitude relation, and an output transformer connected between the remaining junctions of said bridge, whereby upon deviation of said high frequency amplitudes from said predetermined relation an output reversible-phase variable-magnitude alternating signal is produced by said transformer having a phase-sense and magnitude corresponding respectively to the sense and magnitude of deviation of said high frequency amplitudes from said predetermined relation.

18. Ultra high frequency apparatus comprising a bridge circuit having a pair of passive impedance elements in the arms thereof, said elements having variable impedance magnitude in correspondence with the amplitude of high frequency energization thereof, means for differentially applying high frequency energy to said elements, said differential energy representing deviation of the frequency of said energy from a desired value, whereby said bridge is unbalanced in correspondence with said deviation, and means responsive to unbalance of said bridge for producing a signal corresponding to said frequency deviation.

19. High frequency apparatus comprising a source of variable-frequency wave, means for deriving from said source a pair of waves of said variable frequency differentially varying in amplitude in correspondance with deviation of the frequency of said source from a predetermined value, said pair of waves having predetermined relation for a frequency of said source equal to said predetermined value, a bridge circuit having a pair of passive impedance elements in the arms thereof, said elements having variable impedance magnitude in correspondence with high frequency energization thereof, means for energizing said elements respectively by said pair of waves, a source of local oscillations coupled to one diagonal of said bridge circuit said bridge being balanced for high frequency energizations thereof of said predetermined relation, and means responsive to unbalance of said bridge for producing an output alternating signal of the frequency of said local oscillations corresponding to said frequency deviation.

20. Apparatus as in claim 19, further comprising means responsive to said signal for adjusting the frequency of said source to restore said frequency to said predetermined value.

21. Apparatus as in claim 19, wherein said source is frequency-modulated and including means responsive to said produced signal for deriving the modulation signal of the output of said source.

22. High frequency apparatus comprising a source of frequency-modulated wave, means for deriving from said source a pair of waves of the frequency of said source and having amplitudes varying differentially in correspondence with instantaneous deviation of said frequency from a predetermined value, said waves having predetermined amplitude relation for a source frequency of said predetermined value, a bridge circuit having a pair of impedance elements in two arms thereof, said elements having variable magnitude in correspondence with high frequency energization thereof, means for energizing said elements respectively by said waves, means for exciting said bridge by a relatively low frequency wave, said bridge being balanced and producing zero output of said low frequency upon high frequency energizations of said predetermined relation, means responsive to unbalance of said bridge for deriving a reversible-phase variable-magnitude signal corresponding in phase-sense and magnitude to the sense and magnitude of deviation of said pair of high frequency waves from said predetermined amplitude relation, and means for detecting said reversible-phase signal for producing the modulation signal of said frequency-modulated wave.

23. Detector apparatus for detecting a reversible-phase variable-magnitude alternating signal comprising a pair of rectifiers, a center-tapped resistor connected between said rectifiers, a transformer having a center-tapped secondary winding, means connecting the outer terminals of said secondary winding to respective ones of said rectifiers, means impressing said signal between the center taps of said resistor and said winding, means supplying a reference signal of the same frequency as the signal to be detected to the primary winding of said transformer, a second resistor connected between said rectifiers and having an adjustable tap, and an output circuit connected to the center tap of said first resistor and to variable tap on said second resistor, whereby the voltage appearing across the output circuit will have a polarity and magnitude corresponding respectively to the phase-sense and magnitude of said input signal.

24. Ultra high frequency apparatus comprising a cavity resonator, a pair of coupling loops having a common leg and other separate legs and located within said resonator to couple with the electromagnetic field thereof, a concentric transmission line having its inner conductor connected to said common leg, a pair of further concentric transmission lines each having an inner conductor connected with a respective one of said separate legs, and a non-linear impedance element coupled to each of said further transmission lines and within the outer conductor thereof.

25. Electrical apparatus comprising means for producing a pair of signals having amplitudes respectively varying oppositely in response to variation of a predetermined quantity, a bridge circuit having four legs connected to form two diagonals, two of said legs comprising circuit elements of impedance values variable in accordance with the amplitude of applied signals, means for supplying said signals respectively to said elements, a source of local oscillation coupled across one diagonal of said bridge circuit, and an output circuit coupled across the other diagonal of said bridge, said bridge being normally balanced when said signals are equal, whereby said output circuit is energized by a reversible-phase alternating voltage of the frequency of said local oscillation source and having an amplitude corresponding to said quantity.

26. Electrical apparatus comprising a bridge circuit having four legs defining two diagonals, two of said legs comprising circuit elements of impedance values variable in accordance with applied signals, a source of signals varying oppositely in amplitude, means for applying said signals respectively to said elements to correspondingly vary the impedances thereof, a source of local oscillations operating independently of said bridge circuit means for coupling said source of local oscillation to one of said diagonals, and an alternating current output circuit coupled to the other diagonal.

VINCENT R. LEARNED.

REFERENCES CITED

The following references are of record in the file of this patent:

UNITED STATES PATENTS

| Number | Name | Date |
| --- | --- | --- |
| 2,243,202 | Fritz | May 27, 1941 |
| 2,243,414 | Carlson | May 27, 1941 |
| 2,250,532 | Hansell | July 29, 1941 |
| 2,281,550 | Barron | May 5, 1942 |
| 2,294,942 | Varian et al. | Sept. 8, 1942 |
| 2,297,800 | Read | Oct. 6, 1942 |
| 2,299,619 | Fritz | Oct. 20, 1942 |
| 2,304,377 | Roberts | Dec. 8, 1942 |
| 2,312,783 | Trevor | Mar. 2, 1943 |
| 2,337,214 | Tunick | Dec. 21, 1943 |
| 2,343,759 | Fairley et al. | Mar. 7, 1944 |

Certificate of Correction

July 19, 1949

Patent No. 2,476,311     VINCENT R. LEARNED

It is hereby certified that error appears in the printed specification of the above numbered patent requiring correction as follows:

Column 2, lines 49 and 50, for the words "voltage alternating" read *alternating voltage*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*